(12) United States Patent
White

(10) Patent No.: US 6,488,061 B2
(45) Date of Patent: Dec. 3, 2002

(54) SINGLE PASS RADIUS MOLDING SYSTEM

(76) Inventor: Rollie Nathaniel White, 400 Cheek Rd., Monroe, GA (US) 30655

( * ) Notice: Subject to any disclaimer, the term of this patent is extended or adjusted under 35 U.S.C. 154(b) by 0 days.

(21) Appl. No.: 09/826,461

(22) Filed: Apr. 4, 2001

(65) Prior Publication Data

US 2002/0144749 A1 Oct. 10, 2002

(51) Int. Cl.$^7$ .............................. B27M 1/08; B27C 5/00
(52) U.S. Cl. .................. 144/3.1; 144/134.1; 144/135.2; 144/137; 144/371
(58) Field of Search .................. 83/13, 410.9; 144/1.1, 144/2.1, 3.1, 134.1, 135.2, 137, 136.1, 367, 368, 371, 286.1, 286.5

(56) References Cited

U.S. PATENT DOCUMENTS

| | | | |
|---|---|---|---|
| 4,244,253 A | 1/1981 | Flanigan |
| 4,306,598 A | 12/1981 | Peot |
| 4,685,496 A | 8/1987 | Livick |
| 4,986,152 A | 1/1991 | Sammons |
| 5,005,618 A | 4/1991 | Stegherr |

*Primary Examiner*—W. Donald Bray
(74) *Attorney, Agent, or Firm*—Rodgers & Rodgers

(57) ABSTRACT

A molding system to form a decorative use in a single pass and having a horizontal profile cutter, a first vertical cutter disposed adjacent an end of the horizontal cutter, a second vertical cutter secured to a hinged door by means of an extension, and the extension partially disposed in a recess formed on the adjacent end of the horizontal cutter.

9 Claims, 5 Drawing Sheets

SINGLE PASS RADIUS MOLDING SYSTEM

BACKGROUND OF THE INVENTION

In the production of curved door and window arches, it is necessary to cut the inner and outer surfaces of the arch as well as the decorative face or profile of the arch. Historically these cuts have been made by means of successive separate cutting operations in order to achieve the completed arch design. Of course, this means of cutting an arch is quite time consuming and labor intensive.

BRIEF SUMMARY OF THE INVENTION

By this invention, a single pass radius molding system is provided for a decorative arch. A pair of vertically disposed cutters are provided to cut the inner and outer surfaces of the arch and a horizontally disposed cutter is positioned between the two vertical cutters to cut the profile of the arch. A recess is formed in the inner end of the horizontal profile cutter with the inner vertical cutter rotatably positioned on an extension secured to a door hinged to the frame. To provide stability, the free end of the extension is disposed in the recessed end of the horizontal cutter during a cutting operation.

DETAILED DESCRIPTION OF THE INVENTION

Figure 1:
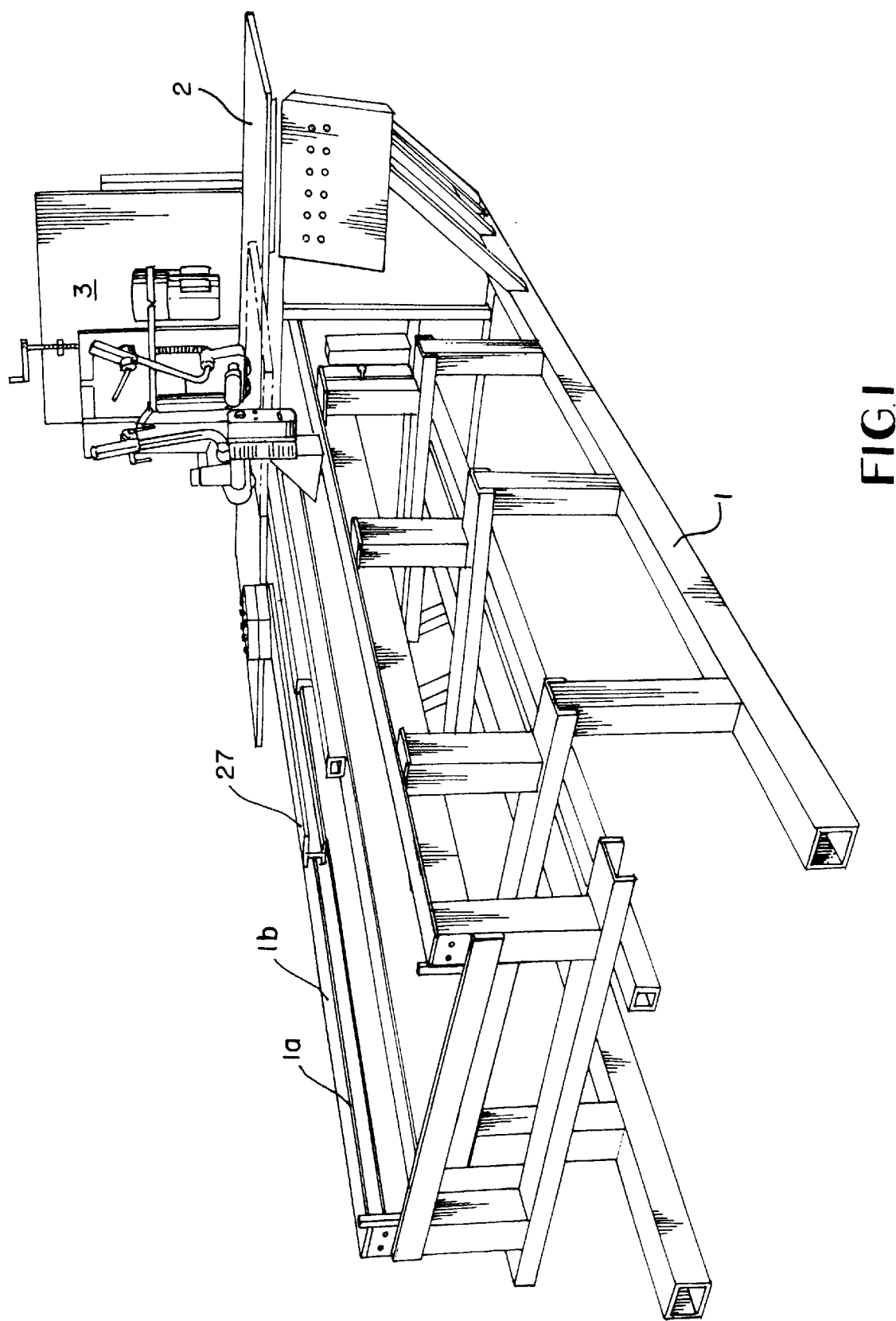
FIG. 1 is a perspective view of the cutting machine according to this invention.

In the drawings, and with particular reference to FIG. 1, the numeral 1 designates multiple horizontal and vertical beams interconnected to form a frame for the molding system. Working surface 2 is supported on frame 1 and backboard 3 is joined to the rear edge of working surface 2 and extends vertically upward therefrom. Backboard 3 acts as attachment means for certain elements of the molding system.

Figure 2:
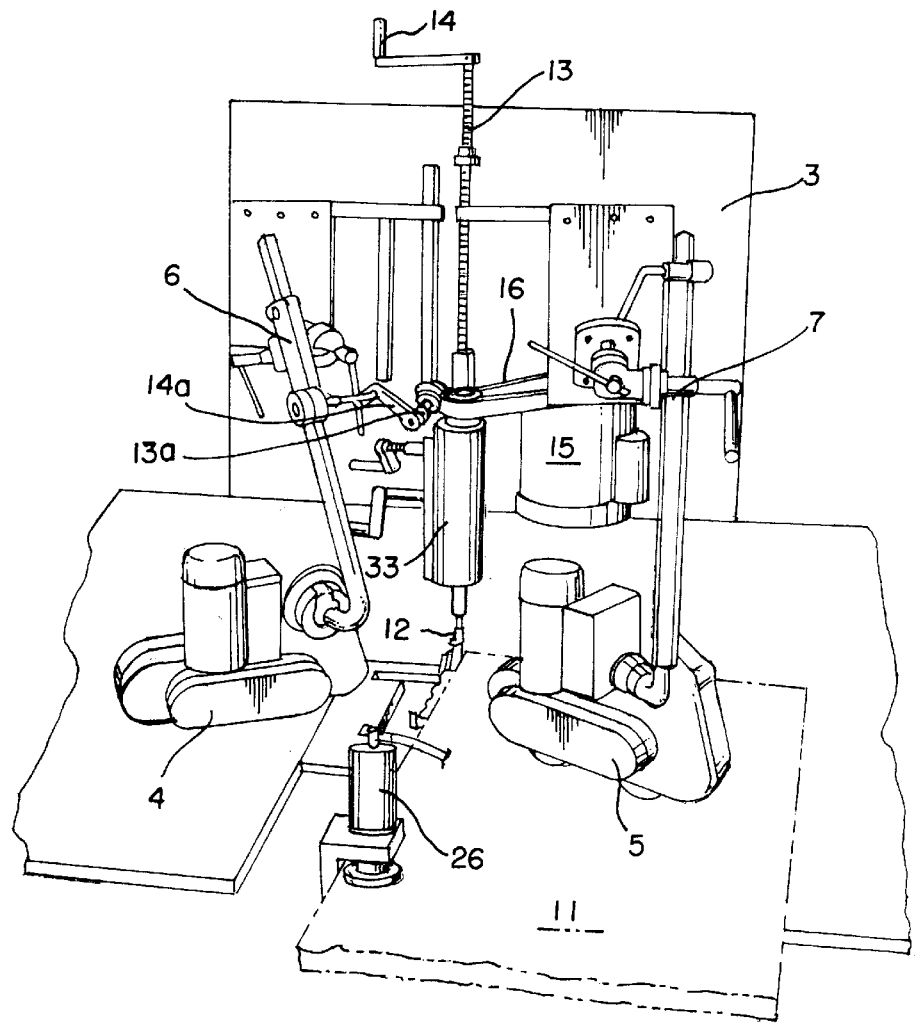
FIG. 2 is an enlarged perspective view of the rear cutting shaft.
Figure 3:
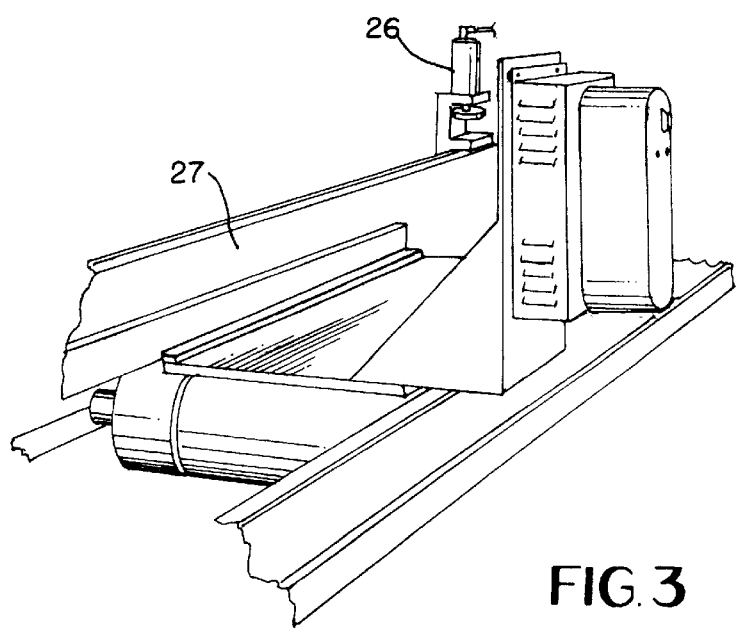
FIG. 3 is an enlarged perspective view showing the radius setting of the machine.
Figure 5:
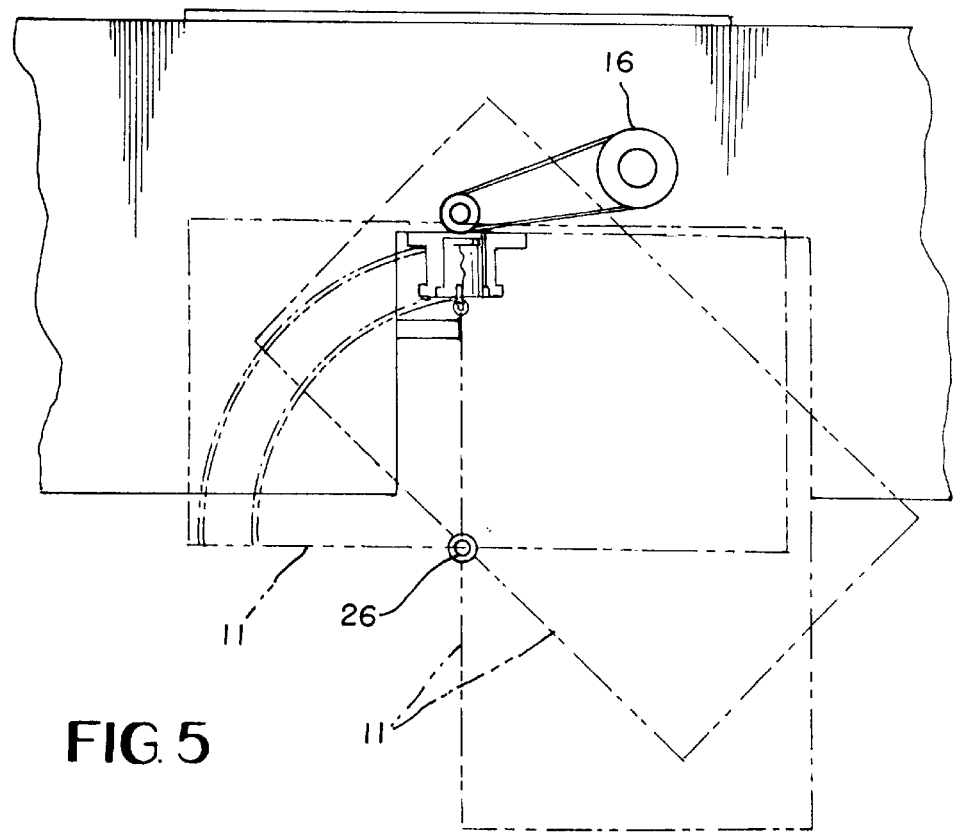
FIG. 5 is a top plan view of the cutting operation.

For the purpose of reducing vibration in the molding process and as shown in FIG. 2, rollers 4 and 5 are provided and, in order to accommodate various thicknesses in the workpieces, are vertically adjustable by means of adjustment assemblies 6 and 7. Adjustment assemblies 6 and 7 are secured to backboard 3 by any suitable means.

In order to cut a decorative arch shape in workpiece 11, three molding cutters are utilized. More specifically, molding cutter 12 is provided for the purpose of cutting the outside vertical surface of the arch. Molding cutter 12 is adjustable in the vertical direction by means of threaded adjustment device 13 and horizontally by means of adjustment device 13a both of which are rotated in either direction, respectfully, by means of cranks 14 and 14a to cause cutter 12 to be raised or lowered and maneuvered in or out. Operational rotation of molding cutter 12 is achieved by means of motor 15 which rotates pulley and belt assembly 16.

Cutter 12 can be utilized for either the inside or outside cut of the arch. For purposes of the outside cut, threads holding the cutter in the end of the shaft must be left-handed or of a clockwise configuration. The rotation of the shaft and cutter must be counterclockwise which allows the cut of the arch to be smooth and keeps the bit tight in the taper of the shaft. When utilizing cutter 12 for the inside cut of the arch, the threads for holding the cutter in the shaft must be right-handed and the cutting rotation of the shaft and cutter must be [left-handed or] clockwise also to obtain a smooth cut and keep the bit tight in the taper of the shaft.

Figure 4:
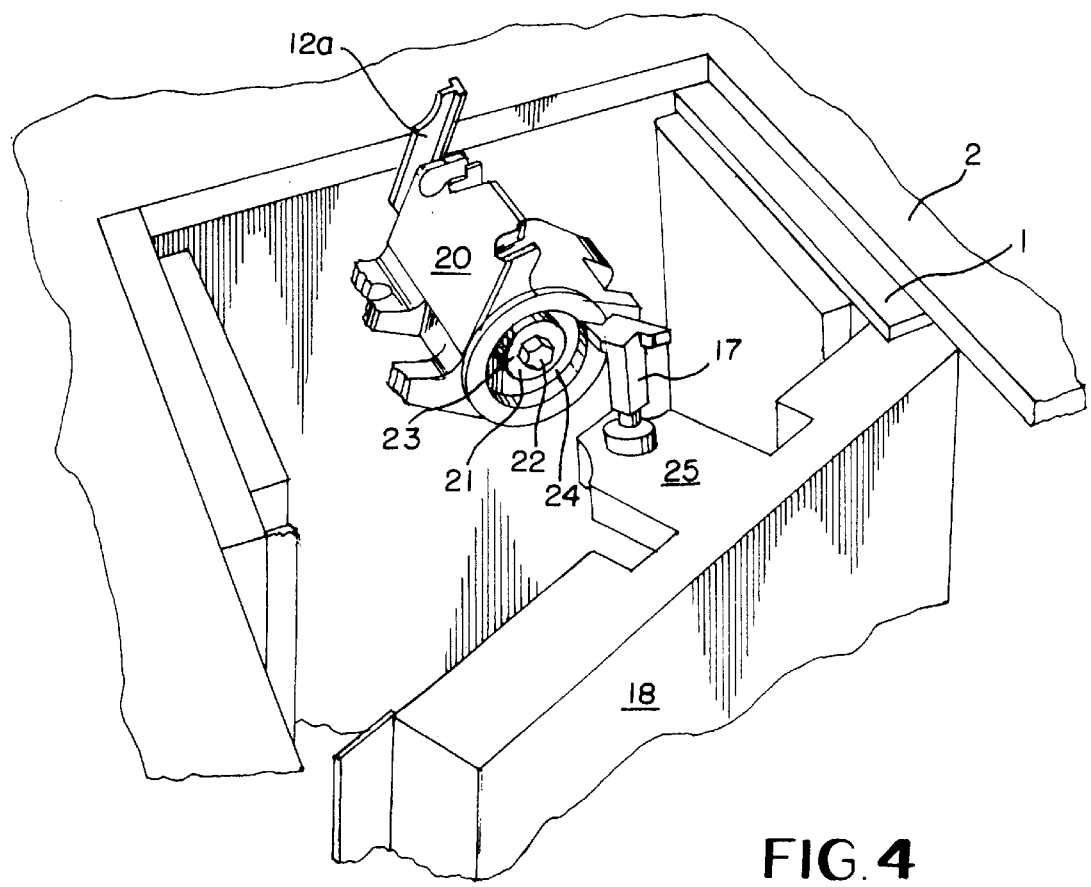
FIG. 4 is an enlarged perspective view of the inner vertical cutter and the horizontal profile cutter.

When cutter 12 is not utilized for the inner cut, the inner vertical surface of the arch is machined by means of molding cutter 17 which is rotatably mounted on [hinged] door 18 which is hinged to frame 1, as shown in FIG. 4. The decorative profile cut is achieved by means of molding cutter 20 which is specially designed with a point zero shaving blade and cutting edges on both sides and the tip. Molding cutter 20 is rotatably mounted on shaft 21 and secured thereto by means of bolt 22 which is affixed through plate 23 to shaft 21.

In alternative arrangement, cutter 12a, as shown in FIG. 4, allows the outside edge to be cut in place of using cutter 12. Shaving cutter 12a rotates in a horizontal disposition and allows the cut to begin as the arch passes through the cuter whereby the back of the arch is shaved to a 90 degree angle. Both sides have cutting edges so as to relieve heat buildup in cutter 12a. The cutting edges of cutter 12a should end just below working surface 2 which allows a complete 90 degree dead center cut of the arch. Further, cutter 12a is removable to allow the arch to be reversed to allow adjustment between profile cutter 20, cutter 12 and the outside of the arch. When reversing the arch, if cutter 12a is not removed, it will cut out the profile of the inside of the reversed arch. Shaft 21 is not adjustable which allows for complete changing of cutters of different profiles thereby reducing setup time. The adjustment is built into the radius of each profile cutter which, in turn, allows for later duplication of a particular profile.

As cutter 17 cuts through the arch, it overlaps the cutting tip of cutter 20 when cutter 20 begins the profile cut and cutter 17 acts to finish the profile cut started by cutter 20. This is necessary because in order to have a tip long enough to complete the profile cut by cutter 20 when the arch is small, cutter 20 will cut the inside of the arch and cut into the profile. Also, cutter 17 has sloped side cutting edges to relieve the chopping action and maintain a shaving action to relieve the impact of the cutting forces.

In the molding operation of a decorative arch, the three molding cutters 12, 17 and 20 are of necessity quite close together and the constant vibration of the machine can cause a catastrophic failure when the molding cutters come into contact with each other. In order to prevent molding cutters 17 and 20 from coming into contact, molding cutter 20 is provided with recessed cavity 24 at one end thereof. Further, molding cutter 17 is secured to hinged door 18 by means of tapered extension 25 which is integrally attached to hinged door 18. Therefore, prior to the molding operation, hinged door 18 is closed whereby the free end of extension 25 enters recessed cavity 24 and comes into near contact with bolt 22. By this means, cutters 17 and 20 are disposed in close proximity and any relative movement between molding cutter 17 and molding cutter 20 is prevented since extension 25 is essentially locked in place in cavity 24. By this means, the molding cutters can be operated at extremely high rpm's without any danger of touching.

Figure 6:
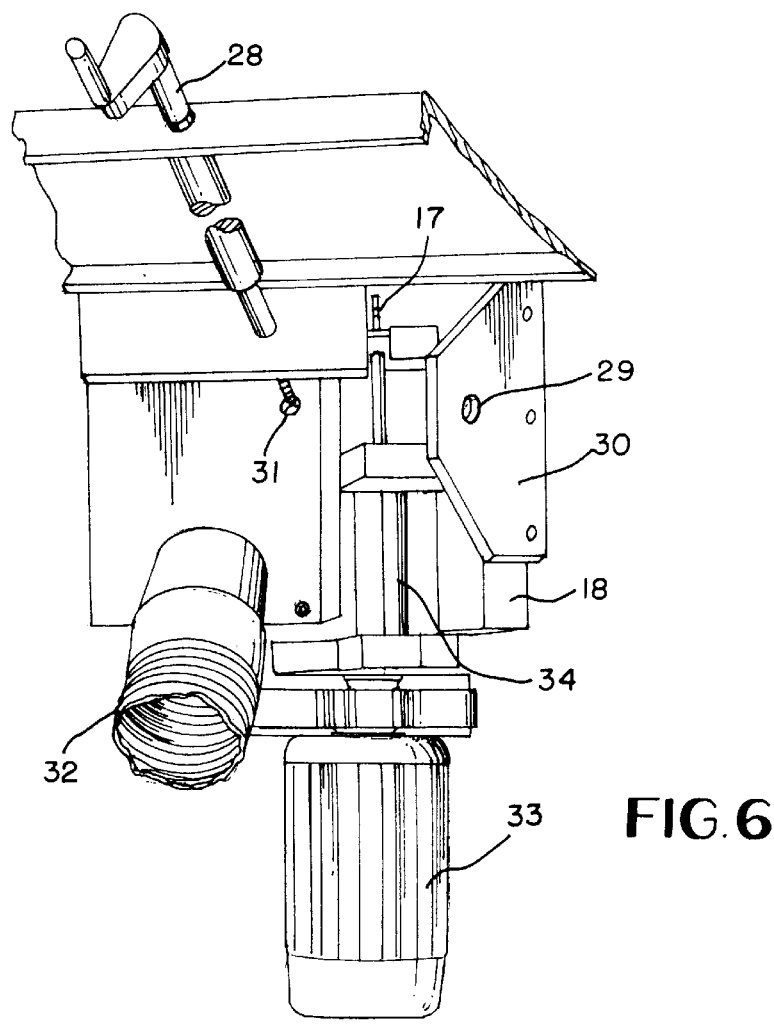
FIG. 6 is an enlarged perspective view from below.

After hinged door 18 is swung into the operating position, it is held in place by means of locking rod 28, a portion of which extends through aperture 29 formed in plate 30 which is secured to hinged door 18. Finally, locking rod 28 is threaded into threaded aperture 31. Excess sawdust is removed from the work area by means of vacuum duct 32. As shown in FIG. 6, cutter 17 is rotated by means of motor 33 through shaft 34.

It is known that router cutters must be run at high rpm's to achieve smooth cuts. If sealed bearings are utilized, the life thereof is very short and, if unsealed bearings with dust shields and an oil mister are utilized, the life is also short due to dust interfering with the operation of the bearings. By running bearings in an oil bath, the speed will cause the bearings to clean themselves thus causing failure.

According to this invention, oil is forced through the bearings, which are unsealed, with a high pressure pump circulating the oil through the bearing and back into a reservoir. This allows for necessary cooling thereby yielding longer bearing life. By using a motor and cutting system and a small cutter shaft, both increased power and high speed rotation of the cutters 12 and 17 are achieved which are not possible with a router motor.

Figure 7:
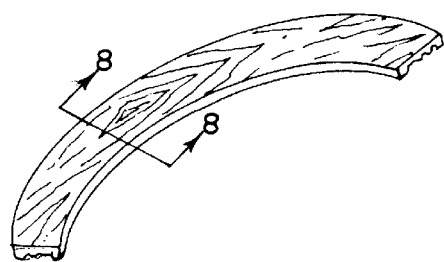
FIG. 7 shows a finished arch.
Figure 8:
FIG. 8 is an elevational view taken along the line 8—8 in FIG. 7.

In operation, workpiece 11 is clamped into position by means of clamping piston 26 on horizontally movable rail 27 which is slidable on flange 1a of beam 1b. Then workpiece 11 is moved into the desired cutting position on rail 27 to a position on top of working surface 2 and in proximity to cutters 12, 17 and 20. Then hinged door 18 closed and, if molding cutter 12 is used rather than cutter 12a, it is lowered into its cutting position. Following this, workpiece 11 is swung through the cutters at pivot point 26 resulting in the finished product as shown in FIGS. 7 and 8.

Figure 9:
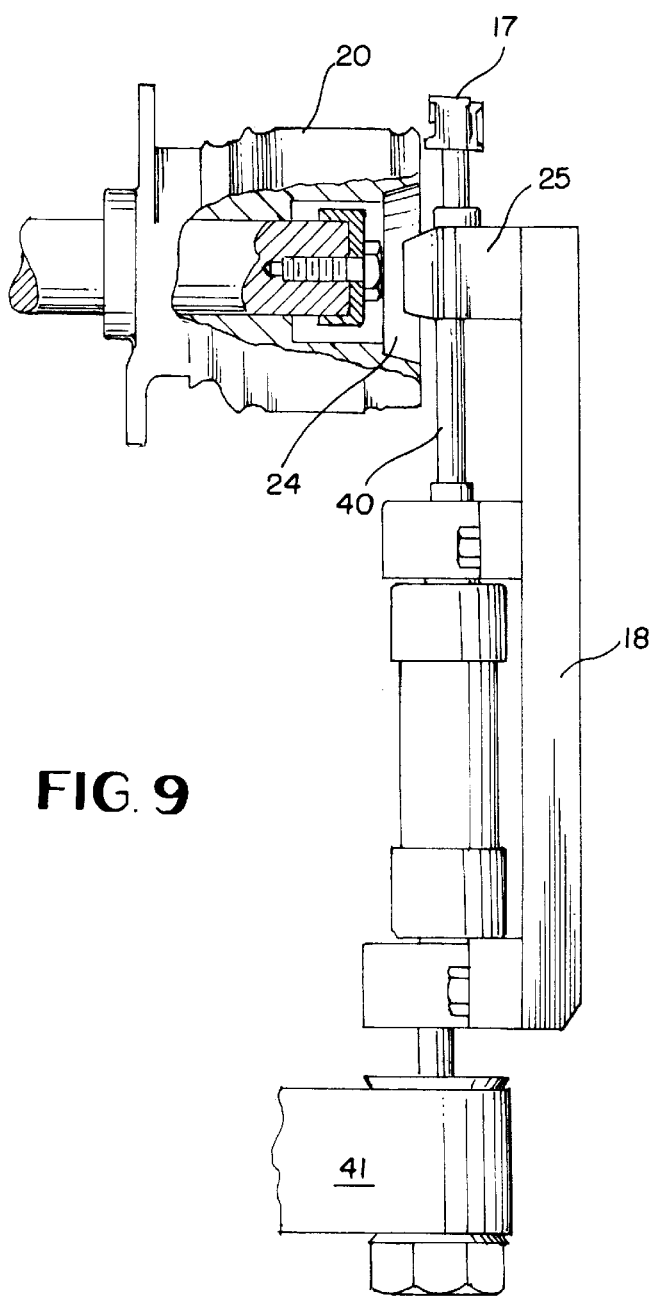
FIG. 9 is an enlarged elevational view of the inner cutter shaft assembly.
Figure 10:
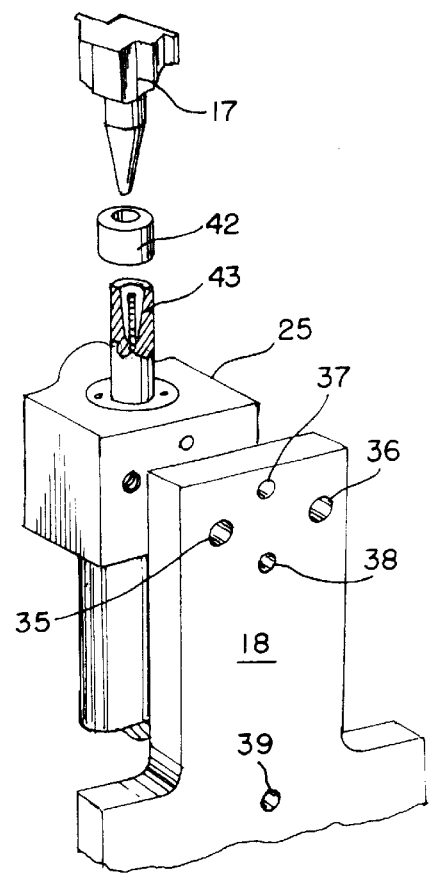
FIG. 10 is an enlarged perspective view of the inner cutter.

An alternative arrangement is depicted in FIGS. 9 and 10 wherein extension 25 is bolted to hinged door 18 through holes 35 and 36 in known manner. Door 18 is provided with lubrication channels 37, 38 and 39 which cooperate with corresponding channels disposed in extension 25. In the arrangement of FIGS. 9 and 10, cutter 17 is disposed above extension 25 by means of shaft 40 which in turn is rotated by means of drive belt 41. In FIG. 10, collar 42 is pressed onto and strengthens the end of shaft 43 and cutter 17 is mounted in the end of shaft 43.

Therefore, by this invention, decorative arches are cut in a high-speed operation with a single pass required in the cutting operation and any chance of the molding cutters actually touching each other is prevented.

What is claimed is:

1. A molding system comprising a frame, a door hingedly attached to said frame, an extension extending from said door, a first cutter rotatably mounted in said extension, a second cutter mounted on said frame at one end thereof, a recessed cavity formed on the other end of said second cutter, and said extension at least partially disposed within said recessed cavity during a cutting operation.

2. A molding system according to claim 1 wherein a third cutter is rotatably mounted on said frame adjacent said second cutter and remote from said recessed cavity.

3. A molding system according to claim 1 wherein a shaving cutter is horizontally rotatable adjacent said second cutter and remote from said recessed cavity.

4. A molding system according to claim 1 wherein said first cutter overlaps said second cutter.

5. A molding system according to claim 1 wherein the free end of said extension is tapered.

6. A molding system according to claim 2 wherein said first and third cutters are vertically rotatable.

7. A molding system according to claim 1 wherein said second cutter is horizontally rotatable.

8. A molding system according to claim 1 wherein said second cutter is mounted on said frame by means of a bolt and said extension is disposed immediately adjacent said bolt.

9. A molding system according to claim 2 wherein said cutters include bearings and said bearings are lubricated by means of oil under pressure.

* * * * *